US010700524B2

(12) United States Patent
Yabe et al.

(10) Patent No.: US 10,700,524 B2
(45) Date of Patent: Jun. 30, 2020

(54) MANAGEMENT DEVICE AND CONTROL METHOD

(71) Applicant: Mitsubishi Electric Corporation, Tokyo (JP)

(72) Inventors: Masaaki Yabe, Tokyo (JP); Yuki Ogawa, Tokyo (JP); Satoshi Minezawa, Tokyo (JP); Takashi Arai, Tokyo (JP); Akira Okumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 137 days.

(21) Appl. No.: 15/759,262

(22) PCT Filed: Jan. 27, 2016

(86) PCT No.: PCT/JP2016/052246
§ 371 (c)(1),
(2) Date: Mar. 12, 2018

(87) PCT Pub. No.: WO2017/130307
PCT Pub. Date: Aug. 3, 2017

(65) Prior Publication Data
US 2018/0254636 A1 Sep. 6, 2018

(51) Int. Cl.
*H02J 3/32* (2006.01)
*H02J 3/38* (2006.01)
(Continued)

(52) U.S. Cl.
CPC ............... *H02J 3/32* (2013.01); *B60L 53/63* (2019.02); *B60L 55/00* (2019.02); *H02J 3/14* (2013.01);
(Continued)

(58) Field of Classification Search
USPC ............................................. 307/20
See application file for complete search history.

(56) References Cited

U.S. PATENT DOCUMENTS

2004/0070280 A1   4/2004  Nakata et al.
2007/0241617 A1  10/2007  Nakata et al.
(Continued)

FOREIGN PATENT DOCUMENTS

EP   2 696 463 A2   2/2014
EP   3 306 771 A1   4/2018
(Continued)

OTHER PUBLICATIONS

Office action dated Mar. 29, 2018 issued in corresponding JP patent application No. 2017-563442 (and English translation thereof).
(Continued)

*Primary Examiner* — Rexford N Barnie
*Assistant Examiner* — Xuan Ly
(74) *Attorney, Agent, or Firm* — Posz Law Group, PLC

(57) ABSTRACT

A photovoltaic power conditioning system (PV-PCS) outputs power generated by a photovoltaic panel. An electric vehicle power conditioning system charges an electric vehicle with power supplied from a commercial power system or the power outputted from the PV-PCS. The PV-PCS directly or indirectly receives limitation information from a server. During a limitation period in which the power to be outputted from the PV-PCS is limited, a management device obtains a suppressed power generation amount on the basis of a readily estimated power generation amount of the PV panel, and controls the PV-PCS so that charging power increases by having the suppressed power generation amount as an upper limit.

12 Claims, 11 Drawing Sheets

(51) Int. Cl.
  *H02J 7/00* (2006.01)
  *H02J 7/35* (2006.01)
  *B60L 55/00* (2019.01)
  *H02J 3/14* (2006.01)
  *B60L 53/63* (2019.01)

(52) U.S. Cl.
  CPC ............ *H02J 3/383* (2013.01); *H02J 7/0068* (2013.01); *H02J 7/35* (2013.01); *H02J 2310/14* (2020.01); *H02J 2310/64* (2020.01)

(56) References Cited

U.S. PATENT DOCUMENTS

| | | | | |
|---|---|---|---|---|
| 2014/0042747 | A1* | 2/2014 | Hoshihira | ............ H02J 7/0068 290/50 |
| 2014/0222237 | A1 | 8/2014 | Hibiya et al. | |
| 2018/0145509 | A1* | 5/2018 | Sato | .......................... H02J 3/14 |

FOREIGN PATENT DOCUMENTS

| | | |
|---|---|---|
| JP | 2004-135454 A | 4/2004 |
| JP | 2012-139019 A | 7/2012 |
| JP | 2012139019 * | 7/2012 |
| JP | 2013-110951 A | 6/2013 |
| JP | 2013132105 A | 7/2013 |
| JP | 2013-172495 A | 9/2013 |
| JP | 2015106937 A | 11/2013 |
| JP | 5738212 B2 | 5/2015 |
| JP | 2015-119356 A | 6/2015 |
| JP | 2017-123747 A | 7/2017 |
| WO | 2013/128731 A1 | 9/2013 |

OTHER PUBLICATIONS

International Search Report of the International Searching Authority dated Apr. 19, 2016 for the corresponding international application No. PCT/JP2016/052246 (and English translation).
Office action dated May 29, 2018 issued in corresponding JP patent application No. 2017-563442 (and English translation thereof).
Extended European Search Report dated Nov. 16, 2018 issued in corresponding EP patent application No. 16887894.0.
Office action dated Aug. 7, 2018 issued in the corresponding JP patent application No. 2017-563442 (and English translation thereof).
Office action dated Jul. 16, 2019 issued in corresponding JP patent application No. 2018-176861 (and English translation thereof).

* cited by examiner

FIG.2A

| TIME SLOT [24-HOUR HOURLY TIMES] | 0 – 9 | 9 – 11 | 11 – 13 | 13 – 15 | 15 – 24 |
|---|---|---|---|---|---|
| OUTPUT UPPER LIMIT [ % ] | 100 % | 40 % | 40 % | 40 % | 100 % |

FIG.4

| CONTROL STATUS | PRIORITY | DESCRIPTION |
|---|---|---|
| MANUAL OPERATION | HIGH ⟷ LOW | STATE IN WHICH USER'S MANUAL OPERATION PERFORMS EV CHARGE, STOP AND EV DISCHARGE |
| EVENT OPERATION | | STATE IN WHICH OPERATION (EV CHARGE AND THE LIKE) IS PERFORMED BASED ON "EV UTILIZATION" EVENT REGISTERED IN SCHEDULER |
| COOPERATION OPERATION AT TIME OF LIMITED POWER OUTPUT | | STATE IN WHICH EV CHARGE IS PERFORMED AT TIME OF LIMITED OUTPUT |
| PLAN OPERATION | | STATE IN WHICH PLAN OPERATION PERFORMS OPERATION <EXAMPLES OF PLAN OPERATION><br>・SELLING POWER PRIORITY PLAN (ECONOMIC EFFICIENCY OF MODE A)<br>・SURPLUS POWER SELLING PLAN (ECONOMIC EFFICIENCY OF MODE B)<br>・SELLING POWER MINIMUM PLAN (ENVIRONMENT PRIORITY MODE)<br>・POWER CHARGING PLAN (EMERGENCY RESPONSE) |

MANAGEMENT DEVICE AND CONTROL METHOD

CROSS REFERENCE TO RELATED APPLICATION

This application is a U.S. national stage application of PCT/JP2016/052246 filed on Jan. 27, 2016, the contents of which are incorporated herein by reference.

TECHNICAL FIELD

The present disclosure relates to a management device and a control method that can effectively utilize power in a limitation period in which power output from a generation facility is limited.

BACKGROUND ART

In recent years, a home system, for example, a home energy management system (HEMS), is widespread in which a power generation facility as represented by photovoltaic generation is introduced. This home system can appropriately manage power of a home in general.

Power storage facilities such as electric vehicles and stand-alone type batteries are often introduced in the home systems. As background technology of the home system in which a power generation facility and a power storage facility are introduced, for example, Patent Literature 1 discloses an invention of a power storage type power generation system that can store power from a power generation facility or a commercial power system (commercial power source). In addition, Patent Literature 2 discloses an invention of a load control device that uses surplus power of an electrical generator to operate a load device.

CITATION LIST

Patent Literature

Patent Literature 1: U.S. Pat. No. 5,738,212
Patent Literature 2: Unexamined Japanese Patent Application Kokai Publication No. 2013-110951

SUMMARY OF INVENTION

Technical Problem

A supply-demand balance of a commercial power system is sometimes unbalanced due to a reverse flow, in which power is supplied from a consumer having introduced a power generation facility back to the commercial power system. For example, on a clear holiday, power demand largely decreases, and also the power supply increases with an increase in a power generation amount.

Therefore, in order to maintain the supply-demand balance of the commercial power system, maintenance of a system for a power supplier to specify a time slot for the consumer and to instruct in advance a suppression (limit) of the reverse flow is now in progress. For example, the Agency for Natural Resources and Energy of Japan in 2014 announced rules for control of the output from photovoltaic power generation. This output control rule adjusts power generation amounts of power generation facilities to suppress selling the power to the commercial power system.

As an example of a specific operation, when the power suppliers plan a limitation period (time slot) to limit outputs from power generation facilities, the power suppliers create limitation information including limitation content (output upper limit) in the limitation period. The power suppliers provide the created limitation information to the power generation facilities through a network. When the limitation period comes, the power generation facility, in accordance with the provided limitation information, suppresses the power generation amount so as not to surpass the output upper limit.

However, the invention described in Patent Literature 1 does not decrease the reverse flow in accordance with the instruction for suppressing the above-mentioned reverse flow. When a system voltage rises due to an actual reverse flow and a threshold voltage is reached, the invention switches to charging operation. In other words, in the invention described in Patent Literature 1, providing of the limitation information is not considered at all. Thus, the invention without modification cannot suppress power even if the limitation period comes. As a result, power cannot effectively be utilized in the limitation period by the invention described in Patent Literature 1.

The invention described in Patent Literature 2 mentions a case in which power generation is limited by a request from a power company. Due to lack of specific description, whether the power can effectively be utilized in the actual limitation period is not known. In addition, an original assumption of the invention described in Patent Literature 2 is the ability to acquire surplus power actually generated by a solar battery (an actual value of the generated power). This is not generally the case. In other words, in a general facility, due to cost reduction, the power actually generated by a solar battery is not acquired. Therefore, grasping the surplus power (how much power does a power conditioner suppress to output) is difficult. In other words, in the general facilities, power cannot be effectively utilized in the limitation period.

The present disclosure is achieved to solve the above-mentioned issues. The objective of the present disclosure is to provide a management device and a control method that can effectively utilize power in the limitation period in which power output from a power generation facility is limited.

Solution to Problem

In order to achieve the above-mentioned objective, a management device according to the present disclosure is a management device configured to manage:
a power generation facility that outputs power generated by a power generation module via a power conditioner; and
a power storage facility that charges power supplied from a power system or power output from the power conditioner;
the management device including control means for controlling the power storage facility to increase charging power in a limitation period in which the power output from the power conditioner is limited.

Advantageous Effects of Invention

According to the present disclosure, in the limitation period in which power output from a power generation facility is limited, power output from a power generation facility can effectively be utilized by appropriately increasing charging power of the power storage facility.

BRIEF DESCRIPTION OF DRAWINGS

FIG. 2A is a table for describing an example of limitation information;

FIG. 4 is a schematic view for describing each control state in Electric Vehicle-Power Conditioning System (EV-PCS);

DESCRIPTION OF EMBODIMENTS

Embodiments of the present disclosure will be described in detail below with reference to the drawings. Here, the same or equivalent components are referred to by the same reference signs in the figures. Hereinafter, as a specific example, a case is described in which the present disclosure is applied to a home system. The present disclosure can similarly be applied, for example, to a building system. In other words, the foregoing describes some example embodiments for explanatory purposes, and does not limit the scope of the present disclosure. Therefore, one skilled in the art can employ embodiments in which some or all components are substituted for equivalents of the components. These embodiments are included in the scope of the present disclosure.

Embodiment 1

Figure 1:
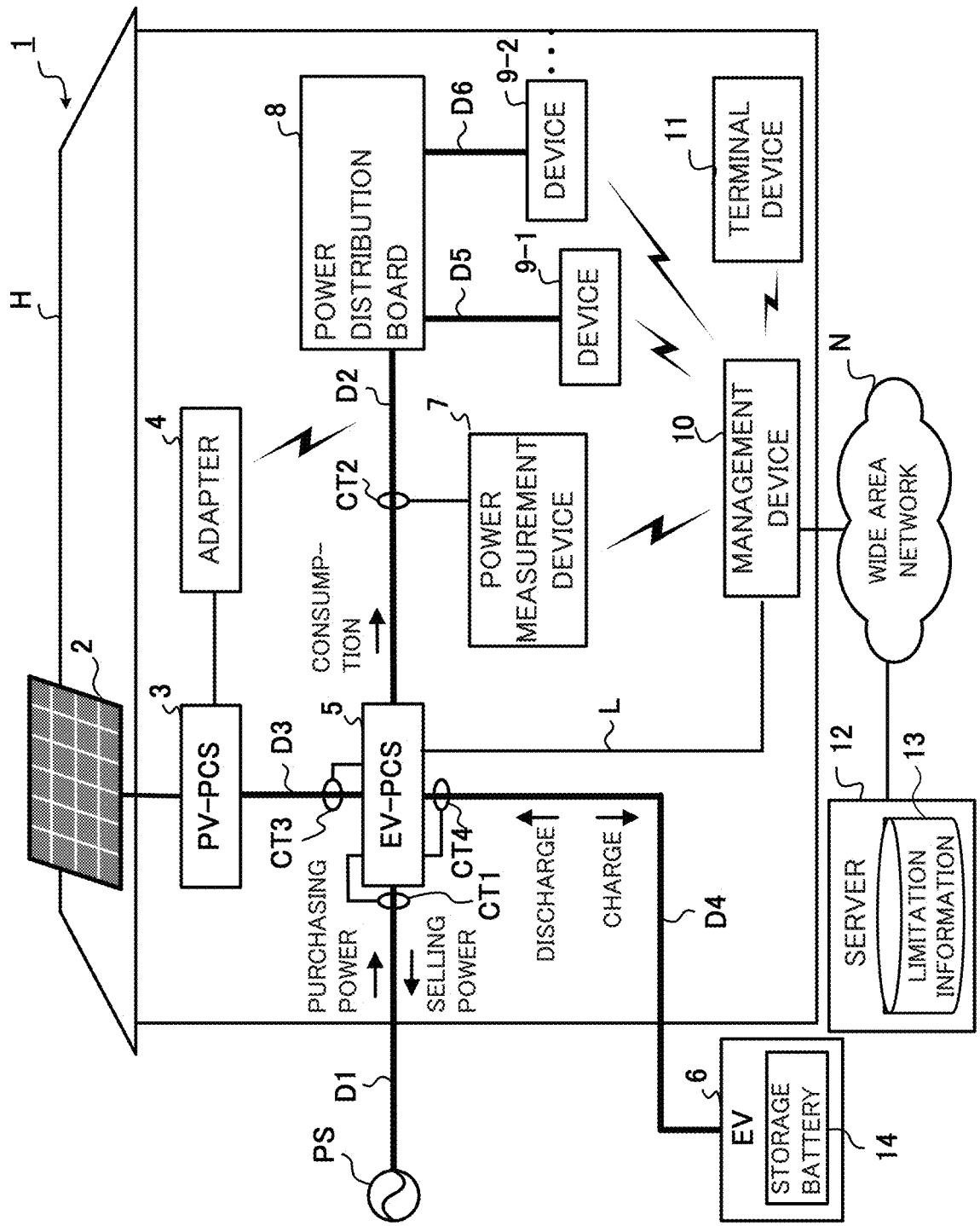
FIG. 1 is a block diagram illustrating an example of an overall configuration of a home system according to Embodiment 1 of the present disclosure.

FIG. 1 is block diagram illustrating an example of an overall configuration of a home system 1 according to Embodiment 1 of the present disclosure. This home system 1 is a system referred to as a Home Energy Management System (HEMS) that manages power used in a home H. The home system 1 includes a Photo Voltaics (PV) panel 2, a Photo Voltaics-Power Conditioning System (PV-PCS) 3, an adapter 4, an Electric Vehicle-Power Conditioning System (EV-PCS) 5, an Electric Vehicle (EV) 6, a power measurement device 7, a power distribution board 8, a plurality of devices 9 (the devices 9-1, 9-2, . . . ), a management device 10, and a terminal 11.

The home system 1 can communicate with a server 12 located outside the home H via an external wide area network N. The server 12 stores the limitation information 13 including a limitation period in which an output from the PV-PCS 3 is to be limited. The limitation information 13 is appropriately read, for example, from the PV-PCS 3 (adapter 4) or the management device 10. In addition, details of the limitation information 13 are described later.

The PV panel 2 is a power generation module that receives sunlight to generate power. Here a case is described in which a rated capacity (maximum power generation) of the PV panel 2 is 5 kW as an example. This PV panel 2 and the following PV-PCS 3 (adapter 4) are included in a power generation facility.

The PV-PCS 3 is a power conditioner for the PV panel 2. The PV-PCS 3 inverts power generated by the PV panel 2 from DC power to AC power, and supplies (outputs) the AC power to the EV-PCS 5 via a power line D3. The power supplied in this way from the PV-PCS 3 can flow in reverse (so-called power selling) to the commercial power system (commercial power source) PS via the EV-PCS 5. In addition to this, the power supplied from the PV-PCS 3 is used for charging the EV 6 (storage battery 14), or is used in the devices 9 via the power distribution board 8. In the limitation period in which the output from the PV-PCS 3 is to be limited, the PV-PCS 3 adjusts output effective power (controls the output) by, for example, a phase advancing control.

The adapter 4 is a communication adapter performing wireless communications as an example. The adapter 4 communicably connects to the management device 10 via a wireless network (not illustrated) built in the home H. In this wireless network, communications in conformity with a well-known communication standard such as, for example, Wi-Fi (registered trademark) and/or Wi-SUN (registered trademark) are performed. The adapter 4 may communicably connect to the server 12 via the wide area network N.

The PV-PCS 3 communicates with the management device 10 via the adapter 4 such as that described above. For example, the PV-PCS 3 receives the limitation information 13 sent from the management device 10 via the adapter 4. The PV-PCS 3 (adapter 4) may directly access the server 12, and receive the limitation information 13 from the server 12, not from the management device 10. In this way, when the PV-PCS 3 receives the limitation information 13, the PV-PCS 3 suppresses the output in the limitation period defined in the received limitation information 13. The limitation information 13 is described as follows.

For example, as illustrated in FIG. 2A, in the limitation information 13, output upper limits (up to how much % of the rated capacity of the PV panel 2 can be output) in each time (time slot) are specified. This example specifies that outputs of 00:00 to 09:00 and 15:00 to 24:00 are 100% (that is, no limit), and outputs of 9:00 to 11:00, 11:00 to 13:00, and 13:00 to 15:00 are 40%. In addition to this, there would be a case in which an output is specified to be 0% depending on a time slot. The limitation period is a time slot in which the output is smaller than 100%. The output upper limit in the limitation period is an upper limit value of power capable of output from the PV-PCS 3. The limitation information 13 indicated in FIG. 2A is an example, and can be appropriately changed. For example, instead of specifying the output upper limit as the ratio (%), the output upper limit may be specified using a power value (n [kW]).

Figure 2B:
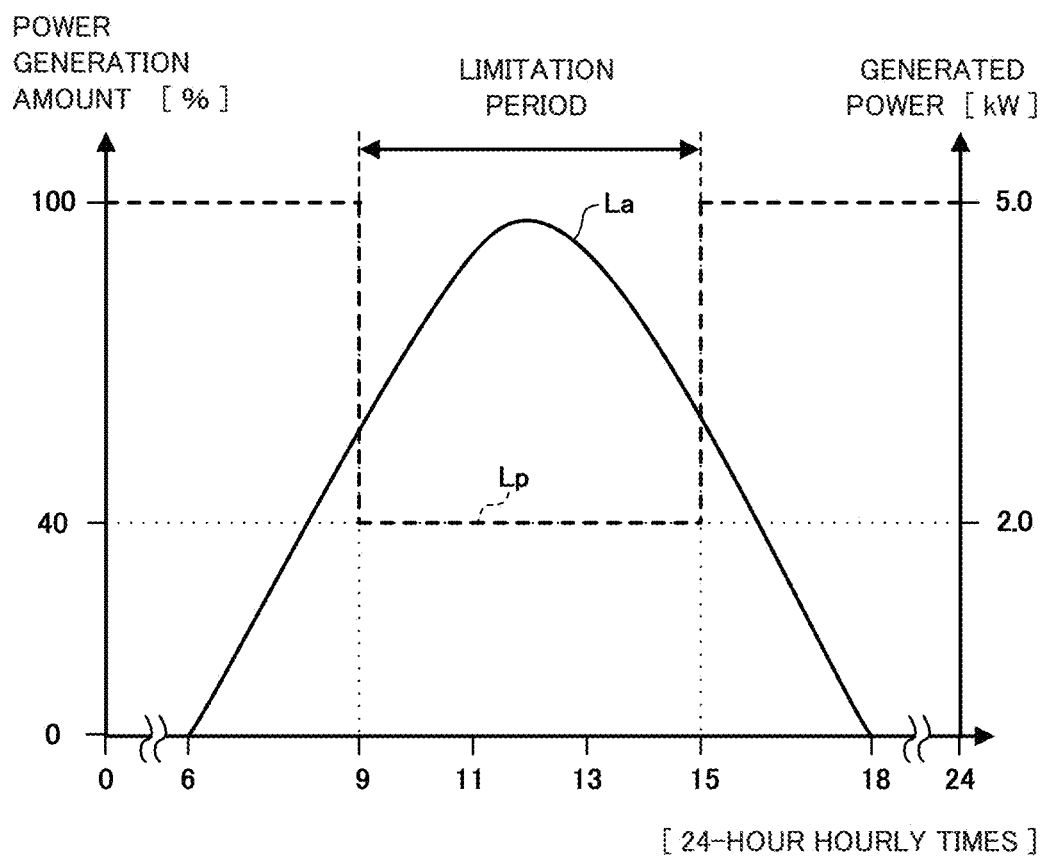
FIG. 2B is a graph for describing a limitation period.

When such limitation information 13 is received via the adapter 4, as illustrated, for example, in FIG. 2B, even if the PV panel 2 generates power as illustrated by a curve La, the PV-PCS 3 outputs power by taking plotted line Lp as upper limit values. In other words, in the limitation period (from 9:00 to 15:00), the PV-PCS 3 adjusts output effective power by using the advancing phase control, and suppressing output power to the upper limit value (line segments Lp) less than the power generated by the PV panel 2.

If a power selling contract between a user and a power supplier is a surplus purchase contract, in a situation in which on-site consumed power (purchasing power) occurs in the limitation period, the PV-PCS 3 is set to be capable of outputting power up to the on-site consumed amount (when the power generation amount of the PV panel 2 is sufficient).

Figure 2C:
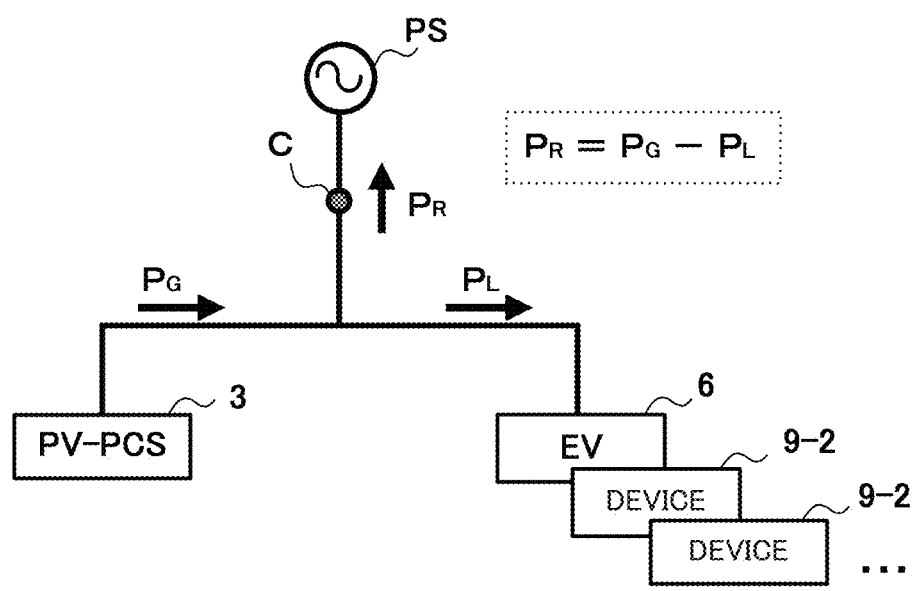
FIG. 2C is a schematic diagram for describing a reverse flow.

In other words, as illustrated in FIG. 2C, a reverse flow $P_R$ at an interconnection point C can be found by the following formula 1 from power $P_G$ output from the PV-PCS 3 and on-site consumed power $P_L$. The on-site consumed power includes charging to the storage battery 14 of the EV 6 and power consumption at the devices 9.

$$P_R = P_G - P_L \qquad \text{(formula 1)}$$

The PV-PCS 3 outputs suppressed power up to the upper limit values (line segments Lp) when the power $P_R > 0$. When the power $P_R \leq 0$, the PV-PCS 3 can increase and output the power until the power $P_R = 0$.

Figure 3:
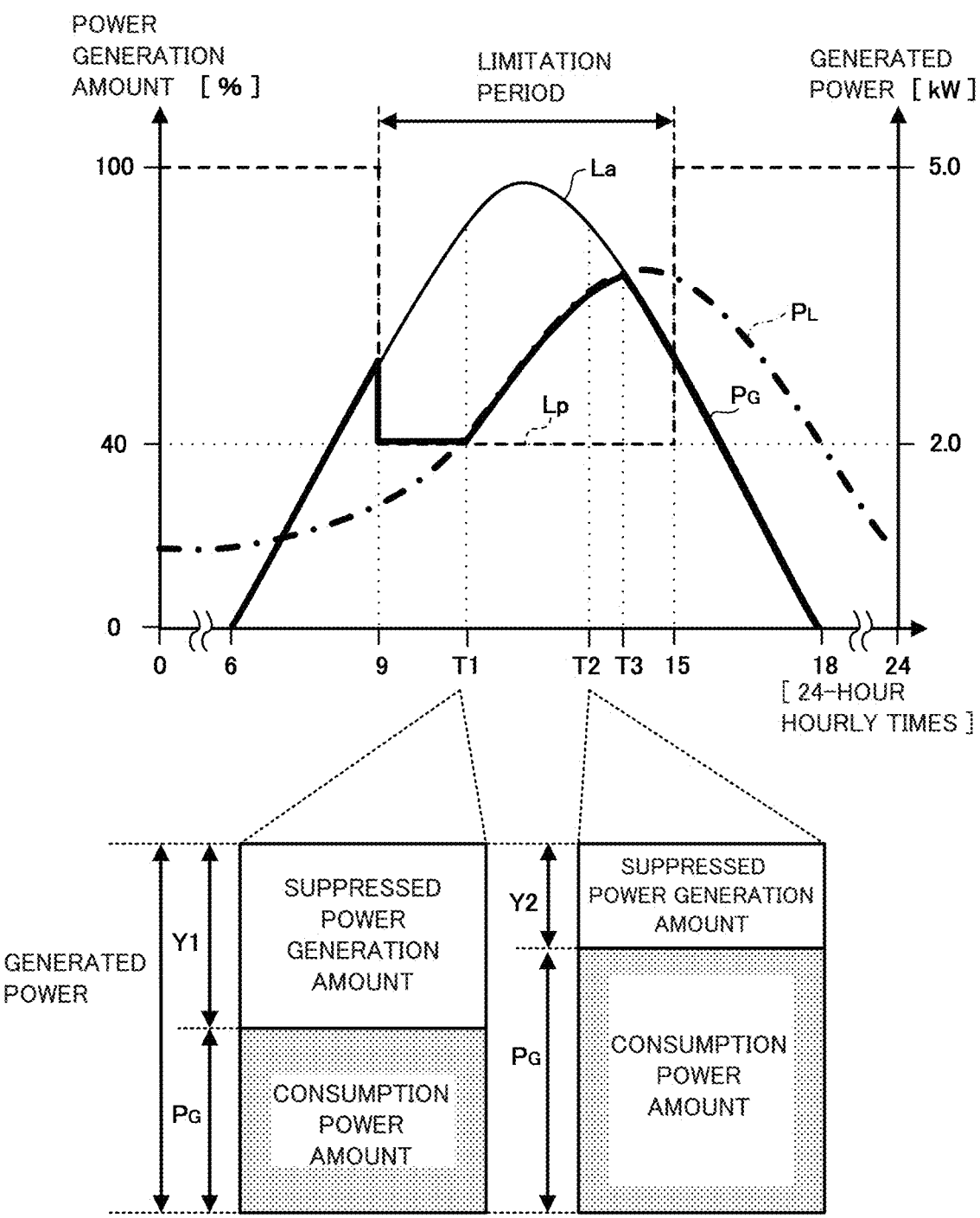
FIG. 3 is a graph for describing a relationship between a power consumption amount and a power generation amount in the limitation period.

Specifically, FIG. 3 is referred and described. In FIG. 3, a transition of the on-site consumed power $P_L$ is illustrated by a dot-dashed line. In addition, transitioning of power La generated by the PV panel 2 is illustrated in a thin solid line. Transitioning of the power $P_G$ output from the PV-PCS 3 is illustrated in a bold solid line. In other words, in a limitation period (from 9:00 to 15:00), the PV-PCS 3 outputs the power $P_G$ up to 2 kW which is an upper limit value in a time slot (9:00—time T1) in which the power $P_L$ is less than the upper limit value (line segment Lp). Then, when the power $P_L$ exceeds the upper limit value (time T1-time T3), the PV-PCS 3 increases the power $P_G$ up to the same power value as the power $P_L$ and outputs the power $P_G$. When the power $P_L$ exceeds the generating power La (time T3—15:00), the PV-PCS 3 outputs the power $P_G$ having the same power value as the generating power La.

More specifically, at the time T1, the power $P_G$ is output up to the upper limit value of the power generation of the PV panel 2, and the generating power La exceeding the upper limit value is a suppressed power generation amount Y1. In other words the PV-PCS 3 shifts a phase to output the power $P_G$ such that the suppressed power generation amount Y1 is reactive power using the advancing phase control. In this way, at the time T1 at which on-site consumed power is low, a ratio of the suppressed power generation amount Y1 to the generating power is high. Thus, the generating power is not considered to be effectively utilized. At the time T2 at which on-site consumed power is high, the power $P_G$ is output up to the on-site consumed amount, and a ratio of the suppressed power generation amount Y2 to the generating power is low. Thus, the generating power is considered to be more effectively utilized.

In other words, in a situation in which the suppressed power generation amount is generated during the limitation period, the consumption power can be increased up to the suppressed power generation amount. The power generation of the PV panel 2 can be effectively utilized by reducing the suppressed power generation amount. It is difficult for a general PV-PCS 3 to grasp such a suppressed power generation amount from outside. In addition, the general PV-PCS 3, due to cost cutting, does not acquire the generating power of the PV panel 2 and a solar radiation amount in the vicinity of the PV panel 2. Therefore, as described later, the management device 10 acquires the suppressed power generation amount in a simplified manner using a past power generation amount output from the PV-PCS 3.

Again in reference to FIG. 1, the EV-PCS 5 is a power conditioner for the EV 6. The EV-PCS 5 controls charging and discharging of the storage battery 14 mounted on the EV 6. When the storage battery 14 is charging, the EV-PCS 5 supplies power from commercial power system PS (power line D1) and the PV-PCS 3 (power line D3) to the storage battery 14 via a power line D4. In addition, when the storage battery 14 is discharging, the EV-PCS 5 supplies the power from the storage battery 14 to the power distribution board 8 via the power lines D4 and D2.

To control the charging and discharging, the EV-PCS 5 measures values of power transmitted in each power line D1, D3, and D4 at every fixed time period (as an example, at every 30 seconds). The power line D1 is disposed between the commercial power system PS and the EV-PCS 5, the power line D3 is disposed between the PV-PCS 3 and the EV-PCS 5, and the power line D4 is disposed between the EV-PCS 5 and the EV 6.

The EV-PCS 5 is connected to the power lines D1, D3, and D4 via Current Transformers (CT) CT1, CT3, and CT4 and a communication line. CT1, CT3 and CT4 are respectively connected to the power lines D1, D3, and D4. CT1, CT3 and CT4 are sensors measuring an AC current (this similarly applies to CT2 that will be mentioned later). The EV-PCS 5 measures power value of the power line D1 based on a measurement result of the CT1. Similarly, the EV-PCS 5 measures power value of the power line D3 and D4 based on measurement results of CT3 and CT4.

In addition, the EV-PCS 5 is communicably connected to the management device 10 via a dedicated communication line L. The EV-PCS 5 transmits measured power values of the power lines D1, D3, and D4 to the management device 10 in response to a request from, for example, the management device 10. The EV-PCS 5 may communicate with the management device 10 via the above-mentioned wireless network built in the home H.

As illustrated, for example, in FIG. 4, the EV-PCS 5 is controlled by the management device 10, to be in a control state that is any one of a manual operation, an event operation, a cooperation operation at the time of limited power output, and a plan operation. The cooperation operation at the time of limited power output is an operation that appropriately increases on-site consumed power in cooperation with the PV-PCS 3 in the limitation period in which the output from the PV-PCS 3 is to be limited. In other words, the cooperation operation at the time of limited power output is an operation that effectively utilizes the generating power of the PV panel 2 by using the suppressed power generation amount for charging the storage battery 14 of the EV 6 in a state in which the suppressed power generation amount is generated during the limitation period. The details of the cooperation operation at the time of limited power output is described later together with descriptions of the management device 10.

Figure 5:
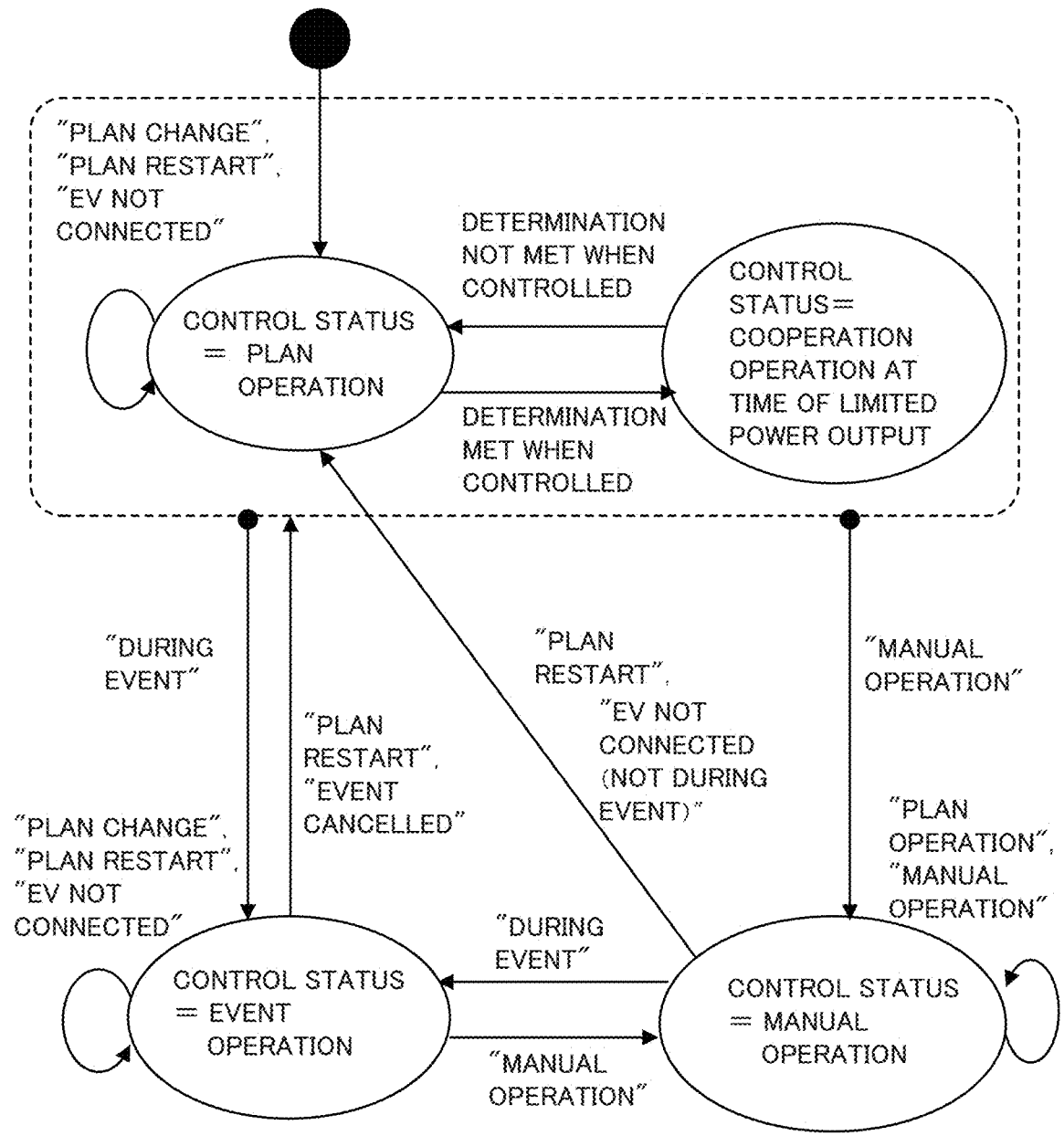
FIG. 5 is a state transition diagram for describing relationships among each control state in the EV-PCS.

The priority of these control states is determined, in descending order, as the manual operation, the event operation, the cooperation operation at the time of limited power output, and the plan operation. In other words, the order of priority is determined such that the degree of priority increases with increasing degree of realization of user intent. Therefore, for example, when an operation is performed by a user, or a schedule of charging or discharging comes during the cooperation operation at the time of limited power output, the control state transitions to higher priority control states such as the manual operation and the event operation. Specifically, as illustrated in the state transition diagram of FIG. 5, the EV-PCS 5 appropriately causes transitions between the control states depending on an occurrence of an event.

Again with reference to FIG. 1, the EV 6 is a vehicle on which the storage battery 14 is mounted. The storage battery 14 is, for example, formed of a lithium ion secondary battery (the type of the secondary battery is freely selected). This EV 6 and the above-mentioned EV-PCS 5 are included in the power storage facility. Alternatively, the power storage facility may use, for example, a stand-alone type battery in place of the EV 6.

The EV 6 is connected to the home system 1 (EV-PCS 5) by a non-illustrated charging connector (connection cable extended from the power line D4). The EV 6 can charge (store) power supplied from the commercial power system PS or the PV-PCS 3 to the storage battery 14 via the EV-PCS 5. In addition, the EV 6 can discharge the power stored in the storage battery 14 and supply the power to the devices 9 via the EV-PCS 5 and the power distribution board 8.

In addition, when the EV 6 is utilized as a vehicle, the charging connector is removed therefrom (separation from the home system 1), a drive system thereof is operated by using the power stored in the storage battery 14, and the EV 6 can freely run. In addition, the EV 6 is not limited to a single vehicle, but may be a plurality of vehicles.

The power measurement device 7 measures a value of power transmitted to the power line D2 of the home H periodically at fixed time intervals (as an example, at every 30 seconds). The power line D2 is disposed between the EV-PCS 5 and the power distribution board 8. The power measurement device 7 is connected to the CT2 connected to the power line D2 via a communication line. The power measurement device 7 measures the power value of the power line D2 based on a measurement result of the CT2.

In addition, the power measurement device 7 includes, for example, a wireless communication interface and is communicably connected to the management device 10 via the above-mentioned wireless network built in the home H. Similar to the above-mentioned PV-PCS 3, the specifications of the power measurement device 7 may allow connection to a wireless network such as the above via the adapter 4.

The power distribution board 8 distributes power transmitted to the power line D2 to the devices 9. In other words the power distribution board 8 distributes the power supplied from the commercial power system PS (the power line D1) and the PV-PCS 3 (the power line D3) via the power line D2 to the devices 9 that are connected to the power lines D5, D6, and the like.

The devices 9 (the devices 9-1, 9-2, and the like) are, for example, electric devices such as an air-conditioner, lighting equipment, a floor heating system, a refrigerator, an Induction Heating (IH) cooking device, a TV, a hot water heater and the like. The devices 9-1, 9-2, and the like are installed in the home H (including premises), and each device is connected to the power lines D5, D6, and the like that the power line D2 is branched off by the power distribution board 8. The devices 9 are communicably connected to the management device 10 via the above-mentioned wireless network built in the home H. The devices 9 may be specified to be connected to such a wireless network via the adapter 4 similar to the above-mentioned PV-PCS 3.

The management device 10 is, for example, an HEMS controller. The management device 10 is installed in an appropriate place in the home H and monitors power consumed and generated power in the home H, that is, a consumption site. The management device 10, for example, generates a monitor screen including numerical values and graphs expressing current values and accumulation values of the consumption power and the generation power to display on the terminal 11. In addition, the management device 10 monitors operation controls and operating conditions of the PV-PCS 3, the EV-PCS 5 and the devices 9. Details of the management device 10 are described later.

The terminal 11 is, for example, a portable device such as, for example, a smartphone or a tablet terminal, the terminal 11 including an input device such as a push button, a touch panel, a touch pad or the like, a display device such as an organic electroluminescence display, a liquid crystal display, or the like, and a communication interface. The terminal 11 is communicably connected to the management device 10 via the above-mentioned wireless network built in the home H. For example, the terminal 11 accepts an operation from a user, and transmits information indicating content of the accepted operation to the management device 10. In addition, the terminal 11 receives information for presenting to the user transmitted from the management device 10, and displays the received information.

Figure 6:
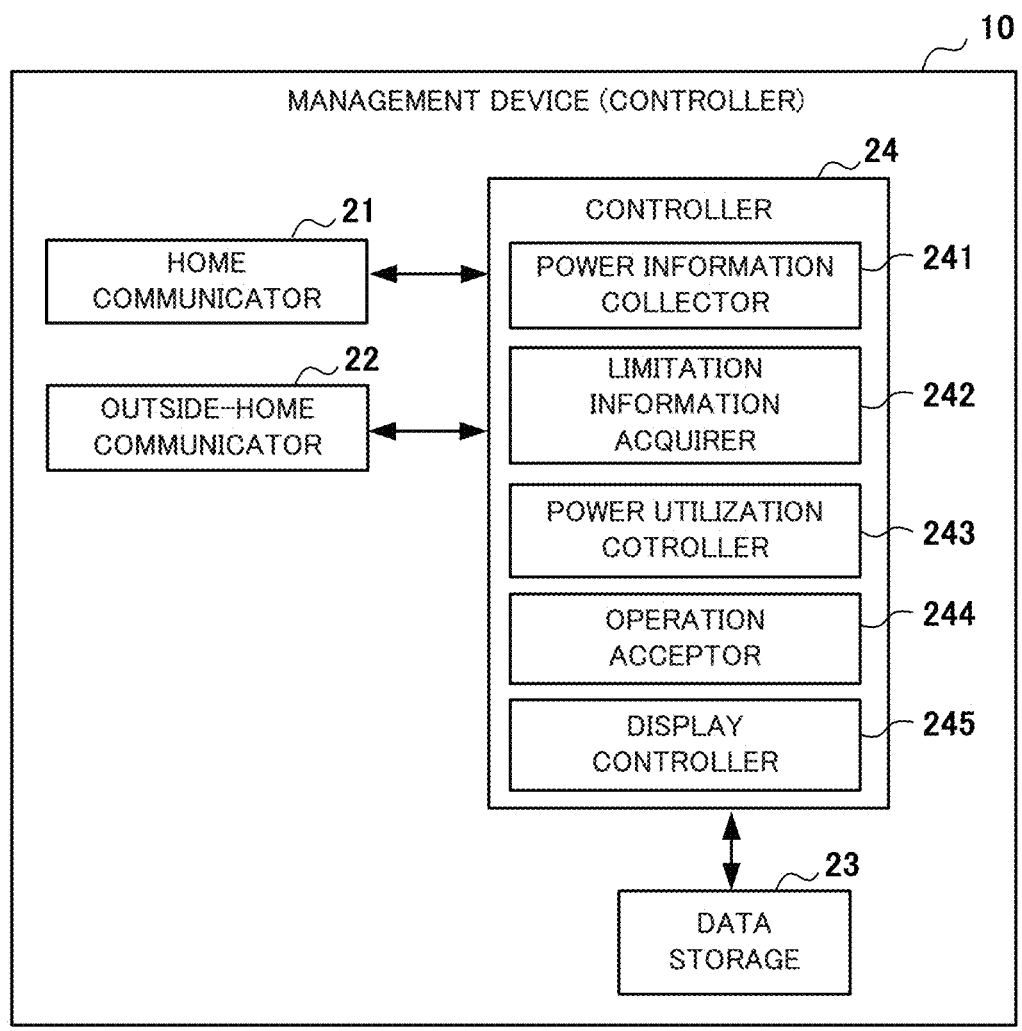
FIG. 6 is a block diagram illustrating an example of a configuration of a management device.

Hereinafter, with reference to FIG. 6, details of the management device 10 are described. FIG. 6 is a block diagram illustrating an example of a configuration of the management device 10. As illustrated in FIG. 6, the management device 10 includes a home communicator 21, an outside-home communicator 22, a data storage 23, and the controller 24.

For example, the home communicator 21 is a communication unit to be connected to the above-mentioned wireless network built in the home H, or to be connected to the EV-PCS 5 again via a dedicated line L. In other words the home communicator 21 communicates with the PV-PCS 3, the EV-PCS 5, the power measurement device 7, the devices 9 and the terminal 11 under the control of the controller 24. For example, the home communicator 21 transmits the above-mentioned limitation information 13 to the PV-PCS 3. In addition, the home communicator 21 transmits a corresponding control command to the EV-PCS 5 to change (transition) a control state of the EV-PCS 5. Furthermore, the home communicator 21 receives power information sent from the power measurement device 7. Additionally, the home communicator 21 transmits the screen data generated by the controller 24 to the terminal 11.

The outside-home communicator 22 is a communication adapter for connecting, for example, to the external wide area network N, and communicates with the external server 12 under the control of the controller 24. For example, the outside-home communicator 22 receives the above-mentioned limitation information 13 sent from the server 12.

The data storage 23 includes, for example, a nonvolatile semiconductor storage device and stores power information received from the power measurement device 7 and the limitation information 13 received from the server 12. In addition, the data storage 23 also stores a current control state (the manual operation, the event operation, the cooperation operation at the time of limited power output, or the plan operation) of the EV-PCS 5 and various data (a standard value, margin, and/or the like) used for determining the control state when the control state is changed (transitioned).

In addition, the data storage 23 also stores past power generation amount information output by the PV-PCS 3. For example, the data storage 23 stores the maximum value of the power generation amounts output by the PV-PCS 3 in the past two weeks in each time slot (as an example, each 30 minute unit increment) as a past actual power generation amount. As will be described later, the controller 24 estimates the past actual power generation amount (the maximum power generation amount) in the same time slot stored in the data storage 23 as a power generation amount of the PV panel 2 with no output limit (so-called PV output suppression), and readily finds a suppressed power generation amount by deducting the on-site consumed power amount from the power generation amount of the PV panel 2 with no output limit. This is because the occurrence of the output limit takes place during clear weather when much solar radiation is expected to be highly probable, the PV panel 2 during the limitation period can be regarded as generating power to the same extent as the past actual power generation amount. In addition, a suggested advantage of using the maximum value in the past two weeks is the including of at least one clear day in the two weeks (exists with an extremely high probability), resulting in continued storing of an effective past actual power generation amount. Having no fine day at all is sufficiently possible in one week in the rainy season. Furthermore, seasons do not greatly change in two weeks. Thus, a power generation amount estimated by using the past actual power generation amount is appropriate.

The data storage 23 stores device information specifying a hardware configuration of the home system 1. The device information, for example, includes information (as examples, setting information, a reference value, a margin and a status, and/or the like) required to control and/or monitor various hardware (the PV-PCS 3, the EV-PCS 5, the EV 6, the power measurement device 7, the devices 9, and the terminal 11) connected to the home system 1. In addition, the data storage 23 also stores contract information indicating the power selling contract that a user enters into the contract with a power supplier. The contract information includes information indicating that the power selling contract is a surplus purchase contract or a full amount purchase contract.

The controller 24 includes a Central Processing Unit (CPU), a Read Only Memory (ROM), and a Random Access Memory (RAM) (all non-illustrated), and controls the whole management device 10. For example, the controller 24 controls a power storage facility (EV-PCS 5, EV 6) to increase the charging power in the limitation period in which the power output from the PV-PCS 3 is limited.

The controller 24 functionally includes a power information collector 241, a limitation information acquirer 242, a power utilization controller 243, an operation acceptor 244, and a display controller 245. These functions are achieved by the CPU using the RAM as a work memory, and appropriately executing various programs (for example, programs of the power utilization control processing and cooperation control processing at the time of limited power output that are mentioned later), for example, stored in the ROM.

The power information collector 241 collects power information including a power amount measured in the power measurement device 7. In other words the power information collector 241 collects a consumption power amount consumed by the devices 9. The power information collector 241 also collects the power amounts of the power lines D1, D3, and D4 measured in the EV-PCS 5.

The limitation information acquirer 242 acquires the limitation information 13 stored by the server 12 via the outside-home communicator 22. In other words the limitation information acquirer 242 acquires the limitation information 13 as illustrated in the above-mentioned FIG. 2A from the server 12.

In order to effectively utilize the suppressed power generation amount in the limitation period, the power utilization controller 243 controls the EV-PCS 5 to charge the suppressed power generation amount to the EV 6 (the storage battery 14). Specifically, the power utilization controller 243 executes charging of the EV 6 when all the following conditions 1 through 4 are satisfied during the cooperation operation of the EV-PCS 5 at the time of limited power output.

The condition 1 requires that a target device (PV-PCS 3, EV-PCS 5, EV 6) exists, and the cooperation control at the time of limited power output is permitted (execution setting is on). Specifically, the condition 1 requires the following:
1a) the PV-PCS 3 is installed;
1b) the user's power selling contract is a surplus purchase contract (not a full amount purchase contract);
1c) the execution setting of the control is on and the PV-PCS 3 suppresses the output;
1d) the EV-PCS 5 is installed; and
1e) the EV 6 is connected to the home system 1 (the EV-PCS 5).
These conditions are required for the condition 1.

The condition 2 requires a purchase power amount ≤α. α is a predetermined fixed amount (the amount has a value close to 0, as an example). In this way when the purchase power amount is greater than the fixed amount (α), charging the EV 6 increases the purchase power amount. Thus the charging of the EV 6 is not executed. In other words, α plays a role as a margin for setting the purchase power amount to have a time width and to permit a temporary purchase of power. This reduces effects from measurement errors at the time of determining whether the control is executed.

The condition 3 requires satisfaction of the following formula:

upper limit value+β(beta)≤power generation amount.

This upper limit value is the upper limit (line segments Lp illustrated in the above-mentioned FIG. 2B) of the power that the PV-PCS 3 can output in the limitation period, and the upper limit value is a value in which the rated capacity of the PV panel 2 is multiplied by the upper limit value (%) of the limitation information 13. β (beta) is a predetermined fixed amount (the amount has a value close to 0, as an example). In this way, the charging of the EV 6 is not executed while the power amount generated by the PV-PCS 3 is small and is less than the sum of the upper limit value and β (beta). In other words, β (beta) plays a role as a margin for suppressing unnecessary purchases of power due to fluctuations of power amounts generated by the PV-PCS 3 and consumption power amounts in real time.

The condition 4 requires satisfaction of the following formula:

power generation amount (past actual power generation amount) of the PV panel 2>consumption power amount−purchase power allowance set value+γ.

The power generation amount of the PV panel 2 is not acquired as described above. Thus the past actual power generation amount is used. The past actual power generation amount is, for example, the past actual power generation amount in the same time slots among past actual power generation amounts in the past two weeks stored in the data storage 23 (maximum power generation amounts in 30-minute increment units). The purchase power allowance set value is a value that determines a permissible purchase power amount when charging the EV 6, and is optionally settable by a user as desired. γ is a predetermined fixed amount (the amount has a value close to 0, for example). In other words γ plays a role as a margin for assuming the power generation amount of the PV panel 2 to be less than the past actual power generation amount in order to make a triggering condition of the purchasing power strict. During charging of the EV 6, the power generation amount (past actual power generation amount) of the PV panel 2 is compared with a value in which an amount corresponding to the charging power of the EV 6 is subtracted from the consumption power amount. The power value of the power line D4 measured in the EV-PCS 5 is used for the charging power of the EV 6 uses. The power measurement device 7 may measure the charging power of the EV 6. When the power can be sold (as an example, a state in which the consumption power amount is less than the upper limit value, or a state in which the power is already being sold) in the limitation period, the power may be sold without charging the EV 6. Therefore the charging of the EV 6 is executed when all these conditions are satisfied including a condition that the consumption power amount is more than or equal to the upper limit value.

The power utilization controller 243 readily estimates the power generation amount of the PV panel 2 by using the actual power generation amount (maximum power generation amounts in 30-minute increment units). As mentioned above, this is because the PV panel 2 during the limitation period is assumed to generate power as much as the past actual power generation amount (an output limit is assumed to be issued when clear weather and much solar radiation amount are expected). In other words, the power utilization controller 243 readily finds the suppressed power generation amount by subtracting the on-site consumed power amount from the past actual power generation amount in the same time slot stored in the data storage 23.

In order to execute charging the EV 6, the power utilization controller 243 instructs a power charge amount to the EV-PCS 5. For example, the power utilization controller 243 sets Pa to the purchase power allowance set value (a value that determines how much purchase power is permitted, when charging the EV 6). This Pa is a fixed value (as an example, 0.5 kW) setting the EV-PCS 5 to charge the EV 6 and to increase the purchase power. In other words the EV-PCS 5 increases charging power (power charge amount) to start purchasing power up to the amount of Pa to charge the EV 6 by setting the Pa which is a value greater than 0 to the purchase power allowance set value of the EV-PCS 5. Then, the PV-PCS 3 increases power to output such that purchasing and selling power amount (reverse flow $P_R$ of FIG. 2C) lines out at 0. Then no power is purchased. Thus, the EV-PCS 5 increases charging power until power begins to be purchased at the Pa level again and charges the EV 6. By repeating these steps, on-site consumed power including the charging power of the EV 6 increases to the power generation amount of the PV panel 2, and the PV-PCS 3 is to output the power amount generated by the PV panel 2 without suppressing the output (without generating the suppressed power generation amount). The EV-PCS 5 can utilize the originally suppressed power generation amount for charging the EV 6 (the storage battery 14).

When a control time constant of the PV-PCS 3 is, for example, as long as several tens of seconds or more, a long time is required for stabilization of the control state. In contrast, the suppressed power generation amount can be effectively utilized in the control state of the PV-PCS 3 having a long control time constant by setting a fixed value (Pa) to the purchase power allowance set value of the EV-PCS 5.

The operation acceptor 244 accepts the operation data in accordance with an operation (for example, various types of operations with respect to the EV-PCS 5) of the user using the terminal 11.

The display controller 245 generates various kinds of screen data for supplying to the terminal 11. For example, the display controller 245 generates operation screen data for operating the EV-PCS 5. Such screen data is transmitted to the terminal 11 by the home communicator 21.

Figure 7:
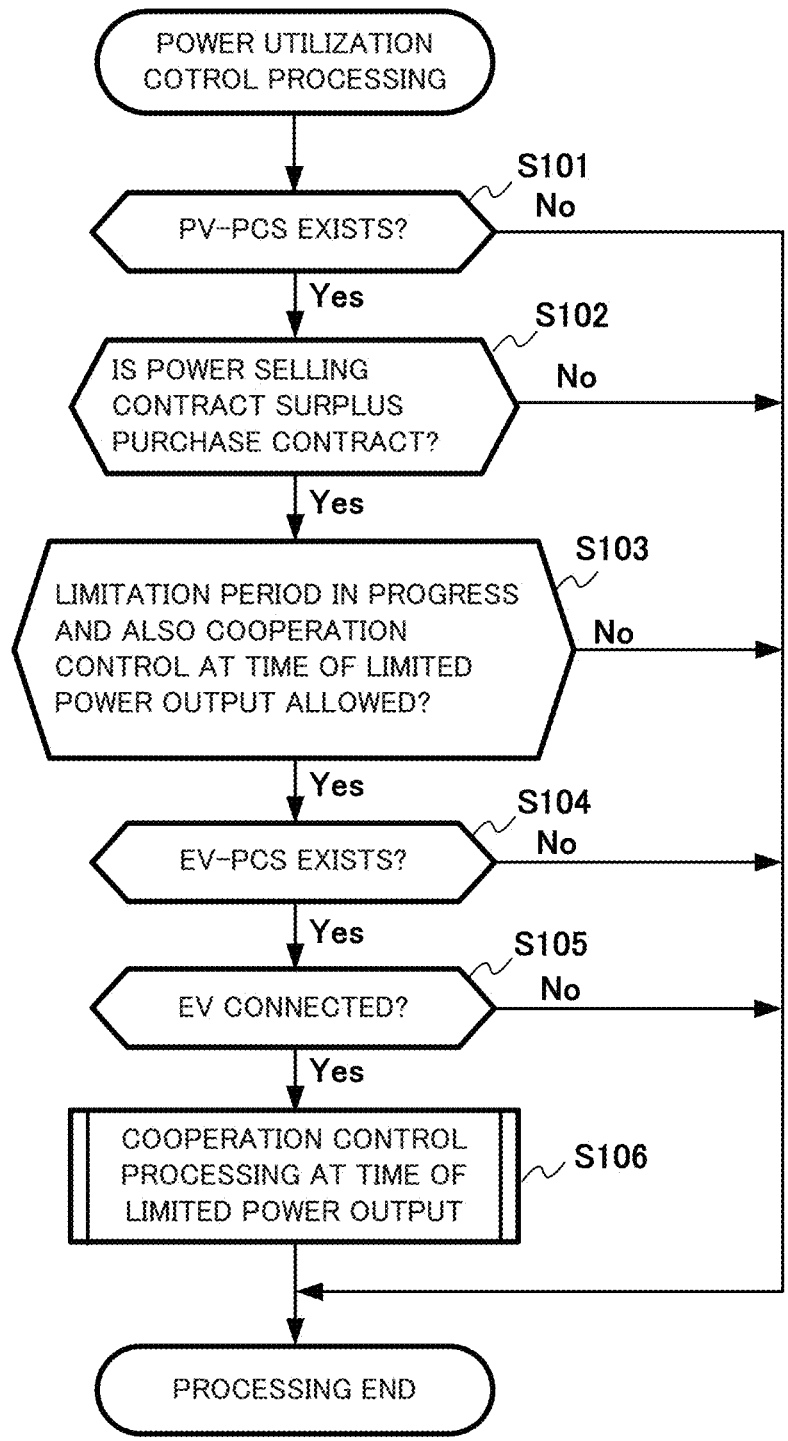
FIG. 7 is flow chart illustrating an example of power utilization control processing according to Embodiment 1 of the present disclosure.
Figure 8:
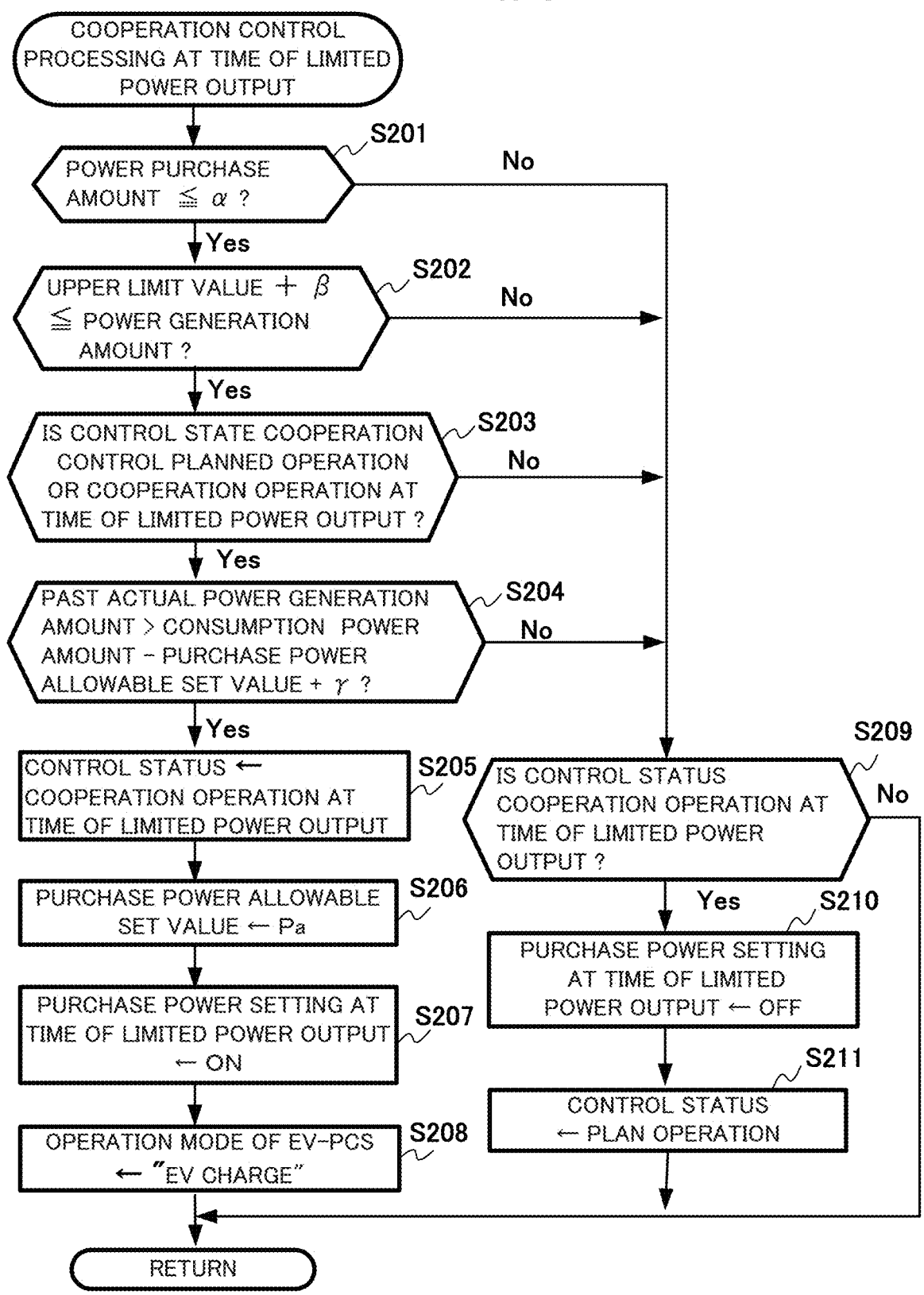
FIG. 8 is flow chart illustrating an example of cooperation control processing at the time of limited power output (subroutine)

An operation of the management device 10 (the controller 24) according to Embodiment 1 of the present disclosure is described as follows with reference to FIGS. 7 and 8. FIG. 7 is a flow chart illustrating an example of power utilization control processing that the controller 24 executes. FIG. 8 is a flow chart illustrating an example of the cooperation control processing at the time of limited power output (subroutine).

As illustrated in FIG. 7, the controller 24 determines whether the PV-PCS 3 exists (or is installed) (step S101). In other words, the controller 24 determines whether the home system 1 includes a power generation facility. As an example, the controller 24 determines the presence of the PV-PCS 3 from the device information stored in the data storage 23. When the controller 24 determines that the PV-PCS 3 does not exist (NO in the step S101), the controller 24 terminates the power utilization control processing without further execution thereof.

When the controller 24 determines that the PV-PCS 3 exists (YES in the step S101), the controller 24 then determines whether the power selling contract is a surplus purchase contract (step S102). In other words, the controller 24 determines whether the power selling contract made between a user and a power supplier is a surplus purchase contract. As an example, the controller 24 determines whether the power selling contract is a surplus purchase contract from the contract information stored in the data storage 23. When the controller 24 determines that the power selling contract is not a surplus purchase contract, (NO in the step S102), the controller 24 terminates the power utilization control processing at the step.

When the controller 24 determines that the power selling contract is a surplus purchase contract (YES in step S102), the controller 24 then determines whether the PV-PCS 3 is in the limitation period and the cooperation control at the time of limited power output is permitted (step S103). As an example, the controller 24 compares the current date and time with the limitation information 13 stored in the data storage 23 and determines whether there is prior arrival of the limitation period. In addition, the controller 24 determines whether the cooperation control at the time of limited power output is permitted from the device information (setting information of the EV-PCS 5) stored in the data storage 23. When the controller 24 determines that the limitation period has not arrived or the cooperation control at the time of limited power output is not permitted (NO in step S103), the controller 24 then terminates the power utilization control processing without further execution thereof.

When the controller 24 determines whether the PV-PCS 3 is in the limitation period and the cooperation control at the time of limited power output is permitted (YES in step S103), the controller 24 then determines whether the EV-PCS 5 exists (or is installed) (step S104). In other words, the controller 24 determines whether the home system 1 includes a power charging facility. As an example, the controller 24 determines the presence of the EV-PCS 5 from the device information stored in the data storage 23. When the controller 24 determines that the EV-PCS 5 does not exist (NO in step S104), the controller 24 then terminates the power utilization control processing without further execution thereof.

When the controller 24 determines that the EV-PCS 5 exists (YES in step S104), the controller 24 then determines whether the EV 6 is connected (step S105). In other words, the controller 24 determines whether the EV 6 is connected to the home system 1 (the EV-PCS 5) by a charging connector which is not illustrated. As an example, the controller 24 determines whether the EV 6 is connected to the home system 1 from the device information (status of the EV 6) stored in the data storage 23. When the controller 24 determines that the EV 6 is not connected (NO in step S105), the controller 24 then terminates the power utilization control processing without further processing thereof.

When the controller 24 determines that the EV 6 is connected to the home system 1 (YES in step S105), the controller 24 then executes the cooperation control processing at the time of limited power output (step S106). The details of the cooperation control processing are described as follows with reference to FIG. 8.

As illustrated in FIG. 8, the controller 24 determines the purchase power amount ≤α (step S201). α is a predetermined fixed amount (the amount has a value close to 0, as an example), and plays a role as the margin for setting the purchase power amount to have a time width and to permit a temporary purchase of power. When the controller 24 determines that the purchase power amount is greater than α (NO in step S201), the processing advances to step S209, which is described below.

When the controller 24 determines the purchase power amount ≤α (YES in step S201), the controller 24 then determines the upper limit value+β (beta)≤the power generation amount (step S202). The upper limit value is an upper limit of the power that the PV-PCS 3 can output in the limitation period, and is acquired using the above-mentioned limitation information 13 (line segments Lp illustrated in FIG. 2B). In addition, β (beta) is a predetermined fixed amount (the amount has a value close to 0, as an example), and plays a role as a margin for suppressing the unnecessary purchase of power in response to real time fluctuations of the power generation amount and the consumption power amount from the PV-PCS 3. When the controller 24 determines that the following formula is not satisfied (NO in step S202), > the upper limit value+β (beta)≤the power generation amount, (the power generation amount is less than the upper limit value+β (beta)), the processing advances to step S209, which is described below.

When the controller 24 determines that the following formula is satisfied (YES in step S202), > the upper limit value+β (beta)≤the power generation amount, the controller 24 determines whether the control state of the EV-PCS 5 is the plan operation or the cooperation operation at the time of limited power output (step S203). In other words the controller 24 determines whether the controller 24 currently controls the EV-PCS 5 in the plan operation or in the cooperation operation at the time of limited power output. When the controller 24 determines that the control state of the EV-PCS 5 is not the plan operation or the cooperation operation at the time of limited power output (the manual operation or the event operation) (NO in step S203), the processing advances to step S209, which is described below.

When the controller 24 determines that the control state of the EV-PCS 5 is the plan operation or the cooperation operation at the time of limited power output (YES in step S203), the controller 24 determines whether the following formula is satisfied (step S204):

> The past actual power generation amount>the consumption power amount−purchase power allowance set value+γ.

The past actual power generation amount is, for example, the past actual power generation amount in the same time slots among past actual power generation amounts in the past two weeks stored in the data storage 23 (maximum power generation amounts in 30-minute increment units). The purchase power allowance set value is a value that determines a permissible purchase power amount when charging the EV 6 (the storage battery 14), and is optionally settable by the user. γ is a predetermined fixed amount (the amount has a value close to 0, for example). In other words γ plays a role as the margin for assuming the power generation amount to be less than the past actual power generation amount in order to make the triggering condition of the purchasing power strict. When the controller 24 determines that the following formula is not satisfied (NO in step S204), > the past actual power generation amount>the consumption power amount−purchase power allowance set value+γ,
>
> (the actual power generation amount is less than or equal to the consumption power amount−purchase power allowance set value+γ), the processing advances to step S209, which is described below.

When the controller 24 determines that the following formula is satisfied (YES in step S204):

> the past actual power generation amount>that consumption power amount−the purchase power allowance set value+γ, the controller 24 sets the control state of the EV-PCS 5 to the cooperation operation at the time of limited power output (step S205). In other words when the current control state is the plan operation, the controller 24 changes from the plan operation to the cooperation operation at the time of limited power output, and when the current control state is the cooperation operation at the time of limited power output, the controller 24 just maintains the current control state.

The controller 24 sets Pa to the purchase power allowance set value of the EV-PCS 5 (step S206). This Pa is a fixed value (as an example, 0.5 kW), and is set to increase charging to the EV 6 (the storage battery 14) for the EV-PCS 5.

The controller 24 turns the purchase power setting of the EV-PCS 5 on when the generated power output is limited (step S207). The controller 24 sets the EV-PCS 5 to increase the power charge amount until a purchase of power occurs and charge the EV 6 by turning on the purchase power setting when the generated power output is limited.

The controller 24 sets the operation mode of the EV-PCS 5 to "EV charge" (step S208). In other words the controller 24 instructs the EV-PCS 5 to perform the charging operation. Then, the controller 24 finishes the cooperation control processing at the time of limited power output.

The EV-PCS 5 having received the instruction to perform the charging operation increases the charging power until the power begins to be purchased at the Pa level that is set in step S206 to charge to the EV 6. Following this, the PV-PCS 3 increases the power to output such that the purchasing and selling power amount (reverse flow $P_R$ of FIG. 2C) converges to 0. Then there is no purchase of power, and thus the EV-PCS 5 increases the charging power until the power begins to be purchased at the Pa level again and charges the EV 6. On-site consumed power including the charging power of the EV 6 increases to the power generation amount of the panel 2 (the past actual power generation amount) by repeating these steps.

Figure 9:
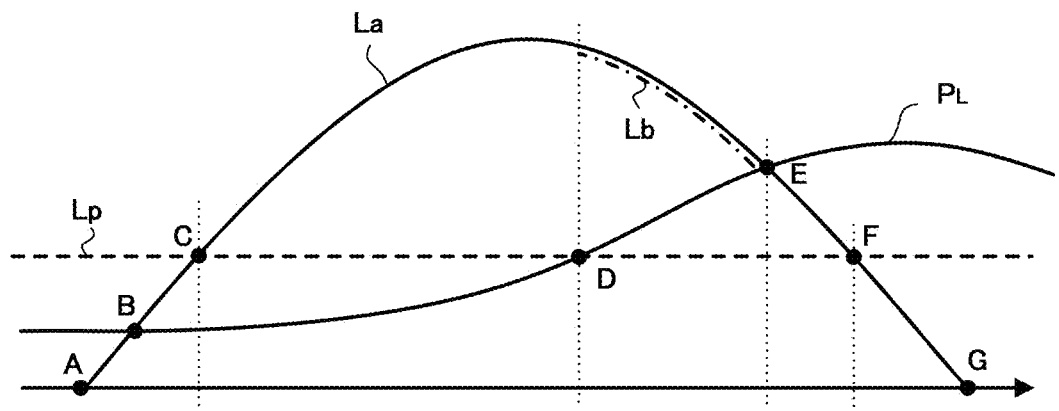
FIG. 9 is a graph for describing circumstances in which charging power increases.

Specifically, as illustrated in FIG. 9, when the cooperation control processing at the time of limited power output is started, for example, at the point C, the EV-PCS 5 increases the charging power to charge to the EV 6 to go along the dot-dashed line Lb. Then, the PV-PCS 3 outputs the power amount generated by the PV panel 2 along the generating power La without suppressing the output (without generating the suppressed power generation amount). In other words, the EV-PCS 5 can utilize the originally suppressed power generation amount for charging the EV 6 (the storage battery 14).

Returning to FIG. 8, when a "NO" (a determination at the time of limited power output is not met) is determined in any one of the above-mentioned steps S201 through S204, the controller 24 determines whether the control state of the EV-PCS 5 is the cooperation operation at the time of limited power output (step S209). In other words the controller 24 determines whether the EV-PCS 5 is currently charging the EV 6 at the time of limited power output. When the controller 24 determines that the control state of the EV-PCS 5 is not the cooperation operation at the time of limited power output, (NO in step S209), the controller 24 finishes the cooperation operation at the time of limited power output.

When the controller 24 determines that the control state of the EV-PCS 5 is the cooperation operation at the time of limited power output (YES in step S209), the controller 24 turns off the purchase power setting at the time of limited power output of the EV-PCS 5 (step S210). The EV-PCS finishes the charging of the EV 6 at the time of limited power output by turning off the purchase power setting at the time of limited power output.

The controller 24 sets the control state of the EV-PCS 5 to the plan operation (step S211). In other words the controller 24 changes the control state of the EV-PCS 5 from the cooperation operation at the time of limited power output to the plan operation.

The power can be effectively utilized by appropriately increasing the charging power of the power storage facility (EV-PCS 5) in the limitation period in which the power output from the power generation facility (the PV-PCS 3) is limited by such power utilization control processing (the cooperation control processing at the time of limited power output). Particularly, the power utilization control processing can readily estimate the suppressed power generation amount, and utilize the suppressed power generation amount to charge the EV 6 (the storage battery 14) by the EV-PCS 5 even in a situation in which grasping the suppressed power generation amount of the PV-PCS 3 is difficult from outside, or the power generation amount of the PV panel 2 and/or a solar radiation amount around the PV panel 2 cannot be acquired. This enables appropriate suppression of system costs.

Modified Example of Embodiment 1

In the above-mentioned Embodiment 1, a case is described in which, when the controller 24 (the power utilization controller 243) commands the EV-PCS 5 by sending thereto the power charge amount, the controller 24 sets Pa to the purchase power allowance set value. The controller 24 may directly instruct the power charge amount using the readily found suppressed power generation amount.

For example, the controller 24 subtracts the on-site consumed power amount (for example, the power amount measured by the power measurement device 7) from the past actual power generation amount (the past actual power generation amount of the same time slot), and readily finds the suppressed power generation amount. Upon acquiring the suppressed power generation amount, the above-mentioned γ (the margin that assumes the power generation amount to be less than the actual value) may further be subtracted therefrom. The controller 24 converts the acquired suppressed power generation amount into a power charge amount corresponding to a W value, and instructs the EV-PCS 5 to charge the power charge amount.

In this case, the suppressed power generation amount can be more effectively utilized because the power charge amount of the EV 6 can be adjusted to match the suppressed power generation amount.

Other Embodiments

In the above-mentioned Embodiment 1, the case is described in which the EV-PCS 5 is controlled in the limitation period. However, the EV-PCS 5 may be appropriately controlled before the limitation period starts. Another embodiment of the present disclosure is readily described as follows.

In the other embodiment, the controller 24 is characterized by planning a charging and discharging schedule of the EV 6 based on the limitation information 13 for the EV-PCS 5. Specifically, as described below, the charging and discharging schedule is planned such that the EV 6 (the storage battery 14) can be charged in the limitation period.

For example, the controller 24 causes the EV 6 to discharge before the arrival of the limitation period and secures a chargeable capacity for the storage battery 14. In addition, the controller 24 urges the user to use the EV 6 and reduces remaining charge of the storage battery 14 one day before the arrival of the limitation period. Furthermore, the controller 24 stops charging that utilizes a late night time slot the day before the arrival of the limitation period. These preliminarily discharging and consuming capacities or the charge limiting capacity may be planned using a power generation amount prediction or a consumption power amount prediction per unit time (as an example, 30 minutes). In addition to this, the controller 24 may set the operation mode of the EV-PCS 5 to a "power selling minimum mode" (an operation mode that performs surplus charging) in response to the arrival of the limitation period.

In this case, a situation in which the EV 6 cannot be charged due to being already fully charged during the limitation period can be avoided. In other words, the charging of the EV 6 can always be performed during the limitation period by appropriately planning the charging and discharging schedule based on the limitation information 13. This enables use of the suppressed power generation amount generated in the limitation period for the charging to the EV 6 (the storage battery 14).

Although the home system 1 is described as an example in the above-mentioned embodiment, this is similarly applicable to, for example, a building system located in a building.

In the above-mentioned embodiment, although a case is described in which the management device 10 is installed in the home H, the management device 10 may be installed outside the home H. For example, the server 12 illustrated in FIG. 1 may function as the management device 10. In this case, the power can be effectively utilized by appropriately increasing the charging power of the power storage facility (EV-PCS 5) in the limitation period.

Furthermore, in the above-mentioned embodiment, although a case is described in which the dedicated management device 10 is used, a personal computer can function as the management device 10 according to the present disclosure by applying an operation program specifying operations of the management device 10 to an existing personal computer and/or information terminal equipment.

A distribution method of such programs is freely selected. For example, these programs may be stored on a computer readable recording medium such as a Compact Disk Read-Only Memory (CD-ROM), Digital Versatile Disk (DVD), Magneto Optical Disk (MO), memory card, and the like to distribute, or may be distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for a management device and a control method that can effectively utilize power in the limitation period in which power output from a power generation facility is limited.

REFERENCE SIGNS LIST

1 Home system
2 PV panel
3 PV-PCS
4 Adapter
5 EV-PCS
6 EV
7 Power measurement device
8 Power distribution board
9 Devices
10 Management device
11 Terminal device
12 Server
13 Limitation information
14 Storage battery
21 Home communicator
22 Outside-home communicator
23 Data storage
24 Controller
241 Power information collector
242 Limitation information acquirer
243 Power utilization controller
244 Operation acceptor
245 Display controller

The invention claimed is:

1. A management device for managing (i) a power generation facility for outputting power generated by a power generation module via a power conditioner, and (ii) a power storage facility for charging power supplied from a power system or power output from the power conditioner, the management device comprising:

a receiver configured to receive limitation information including a limitation period in which power output from the power conditioner is limited and a limit value in the limitation period;

a controller configured to control the power storage facility to increase charging power in the limitation period in which the power conditioner operates based on the limitation information; and a storage configured to store a maximum value, time slot by time slot, in a past certain period among power generation amounts output from the power conditioner, wherein the controller subtracts a current power consumption amount from a target maximum value stored in the storage to find a suppressed power generation amount, and controls the power storage facility to increase the charging power by setting the suppressed power generation amount as an upper limit.

2. A management device for managing (i) a power generation facility for outputting power generated by a power generation module via a power conditioner, and (ii) a power storage facility for charging power supplied from a power system or power output from the power conditioner, the management device comprising:

a receiver configured to receive limitation information including a limitation period in which power output from the power conditioner is limited and a limit value in the limitation period; and a controller configured to control the power storage facility to increase charging power in the limitation period in which the power conditioner operates based on the limitation information, wherein the controller causes the power storage facility to increase charging power up to a predetermined purchase power allowance amount by setting the purchase power allowance amount to the power storage facility, and then controls the power storage facility to automatically increase the charging power by repeating operations in which the power conditioner increases the power.

3. The management device according to claim 2, further comprising:

a storage configured to store a maximum value, time slot by time slot, in a past certain period among power generation amounts output from the power conditioner, wherein the controller subtracts a current power consumption amount from a target maximum value stored in the storage to find a suppressed power generation amount, and controls the power storage facility to increase the charging power by setting the suppressed power generation amount as an upper limit.

4. The management device according to claim 1, wherein the controller, by designating a charging power amount depending on the suppressed power generation amount, controls the power storage facility to increase the charging power.

5. The management device according to claim 1, wherein the controller controls the power storage facility to decrease the charging power amount of the power storage facility before the limitation period starts.

6. The management device according to claim 3, wherein the controller, by designating a charging power amount depending on the suppressed power generation amount, controls the power storage facility to increase the charging power.

7. The management device according to claim 2,
wherein the controller controls the power storage facility to decrease the charging power amount of the power storage facility before the limitation period starts.

8. The management device according to claim 3,
wherein the controller controls the power storage facility to decrease the charging power amount of the power storage facility before the limitation period starts.

9. A control method of a management device for managing (i) a power generation facility for outputting power generated by a power generation module via a power conditioner, and (ii) a power storage facility for charging power supplied from a power system or power output from the power conditioner, the control method comprising:
receiving limitation information including a limitation period in which power output from the power conditioner is limited and a limit value in the limitation period;
controlling the power storage facility to increase charging power in the limitation period in which the power conditioner operates based on the limitation information; and
storing a maximum value, time slot by time slot, in a past certain period among power generation amounts output from the power conditioner,
wherein, during the control of the power storage facility, a current power consumption amount is subtracted from a stored target maximum value to find a suppressed power generation amount, and the power storage facility is controlled to increase the charging power by setting the suppressed power generation amount as an upper limit.

10. The control method according to claim 9,
further comprising causing the power storage facility to increase charging power up to a predetermined purchase power allowance amount by setting the purchase power allowance amount to the power storage facility, and then controlling the power storage facility to automatically increase the charging power by repeating operations in which the power conditioner increases the power.

11. The control method according to claim 9,
further comprising designating a charging power amount depending on the suppressed power generation amount, to control the power storage facility to increase the charging power.

12. The control method according to claim 9,
further comprising controlling the power storage facility to decrease the charging power amount of the power storage facility before the limitation period starts.

* * * * *